(12) United States Patent
Boiron et al.

(10) Patent No.: US 10,860,910 B2
(45) Date of Patent: Dec. 8, 2020

(54) ANTI-COUNTERFEITING LABEL ROBUST TO CRACKING

(71) Applicant: WISEKEY SEMICONDUCTORS, Meyreuil (FR)

(72) Inventors: Ghislain Boiron, Aix en Provence (FR); Tania Guidet, Aix en Provence (FR); Nicolas Gassend, Aix en Provence (FR)

(73) Assignee: WISEKEY SEMICONDUCTORS, Meyreuil (FR)

( * ) Notice: Subject to any disclaimer, the term of this patent is extended or adjusted under 35 U.S.C. 154(b) by 19 days.

(21) Appl. No.: 16/083,254

(22) PCT Filed: Mar. 6, 2017

(86) PCT No.: PCT/FR2017/050493
§ 371 (c)(1),
(2) Date: Sep. 7, 2018

(87) PCT Pub. No.: WO2017/153668
PCT Pub. Date: Sep. 14, 2017

(65) Prior Publication Data
US 2019/0114522 A1   Apr. 18, 2019

(30) Foreign Application Priority Data

Mar. 10, 2016 (FR) .................................... 16 52004

(51) Int. Cl.
*G06K 19/06* (2006.01)
*G06K 19/07* (2006.01)
*H04B 5/00* (2006.01)
*G06K 19/077* (2006.01)
*G06K 19/073* (2006.01)

(52) U.S. Cl.
CPC ... *G06K 19/0723* (2013.01); *G06K 19/07381* (2013.01); *G06K 19/07798* (2013.01); *H04B 5/0062* (2013.01)

(58) Field of Classification Search
CPC .......................... G06K 19/0723; H04B 5/0062
USPC .................................................. 235/492, 375
See application file for complete search history.

(56) References Cited

U.S. PATENT DOCUMENTS 5,313,052 A * 5/1994 Watanabe ............... B64F 1/366
235/375

FOREIGN PATENT DOCUMENTS

FR   2 796 208 A1   1/2001
WO   2015/177448 A1   11/2015

OTHER PUBLICATIONS

May 10, 2017 International Search Report issued in International Patent Application No. PCT/FR2017/050493.

* cited by examiner

*Primary Examiner* — Karl D Frech
(74) *Attorney, Agent, or Firm* — Oliff PLC

(57) ABSTRACT

A near-field magnetically coupled anti-counterfeiting tag including a sacrificial conductive track crossing a sacrificial zone of the tag. Each segment of the sacrificial track crossing the sacrificial zone is split longitudinally into a plurality of sub-segments, the sub-segments being in electrical contact with each other at the ends of the segment.

6 Claims, 1 Drawing Sheet

ANTI-COUNTERFEITING LABEL ROBUST TO CRACKING

FIELD

The invention relates to near-field magnetically coupled contactless identification devices, for example NFC (Near Field Communication) devices as defined by ISO 14443 or ISO 15693, and more specifically to an anti-counterfeiting contactless device for guaranteeing the authenticity of the contents of a bottle.

BACKGROUND

FIG. 1 illustrates an anti-counterfeiting NFC tag as described in patent application WO2015177451. The tag is in the form of a ribbon 10 in an insulating material, used as a substrate for forming conductive tracks according to current RFID tag fabrication techniques.

The center 10-1 of the ribbon tapers out to house an NFC antenna 12 formed of several turns of a conductive track deposited on a first face of the substrate.

The second face of the substrate carries a sacrificial conductive track 14 forming two serially connected loops, 14a and 14b, which respectively cross the two wings 10-2 and 10-3 formed by the ribbon ends on either side of the central region.

A control microcircuit 16 is disposed within the antenna 12 and is connected to the terminals thereof by a first track on the same side as the antenna and another track using vias. The antenna 12 provides power to the microcircuit when it is placed in the field of a reader.

The sacrificial track 14 is connected between a supply pin and an input/output pin of the microcircuit 16, where appropriate through vias, as shown. In this configuration, the microcircuit 16 may be of the VaultIC™ family of circuits, sold by Inside Secure, and be programmed to detect the discontinuity of the sacrificial track 14, as described in patent application WO2015177451.

The tag is designed to be attached to a container, for example a bottle, so that the central portion 10-1 is placed on a closure member of the container, for example a cork. The wings 10-2 and 10-3 are then attached to the neck of the bottle. The extraction of the cork breaks the wings and the sacrificial track 14, triggering a discontinuity detection by the microcircuit 16.

In a simpler tag variant, the sacrificial track 14 may be connected in series with the antenna 12, so that the rupture of the sacrificial track causes suppression of the power supply of the microcircuit.

The rupture strength of the tag may be reduced by providing, as shown, notches 18 in the wings 10-2, 10-3, near the central portion 10-1.

It has been noted, under certain assembly conditions and for certain types of bottle caps or bottle necks, that the sacrificial track 14 breaks as soon as it is assembled, without the wings breaking, rendering the label unusable.

SUMMARY

A near-field magnetically coupled anti-counterfeiting tag is generally provided, comprising a sacrificial conductive track crossing a sacrificial zone of the tag. Each segment of the sacrificial track crossing the sacrificial zone is split longitudinally into a plurality of sub-segments, the sub-segments being in electrical contact with each other at the ends of the segment.

The sub-segments of a same segment may be spaced apart from each other.

The sub-segments of a same segment may be rectilinear and parallel.

Alternatively, one sub-segment of a same segment may have a sinuous shape.

Another sub-segment of the same segment may be rectilinear.

The tag may comprise a central portion and two sacrificial wings radially extending from the central portion, each wing including a loop of the sacrificial conductive track.

BRIEF DESCRIPTION OF DRAWINGS

Other advantages and features will become more clearly apparent from the following description of particular embodiments of the invention provided for exemplary purposes only and represented in the appended drawings, in which.

DESCRIPTION OF EMBODIMENTS

Figure 1:
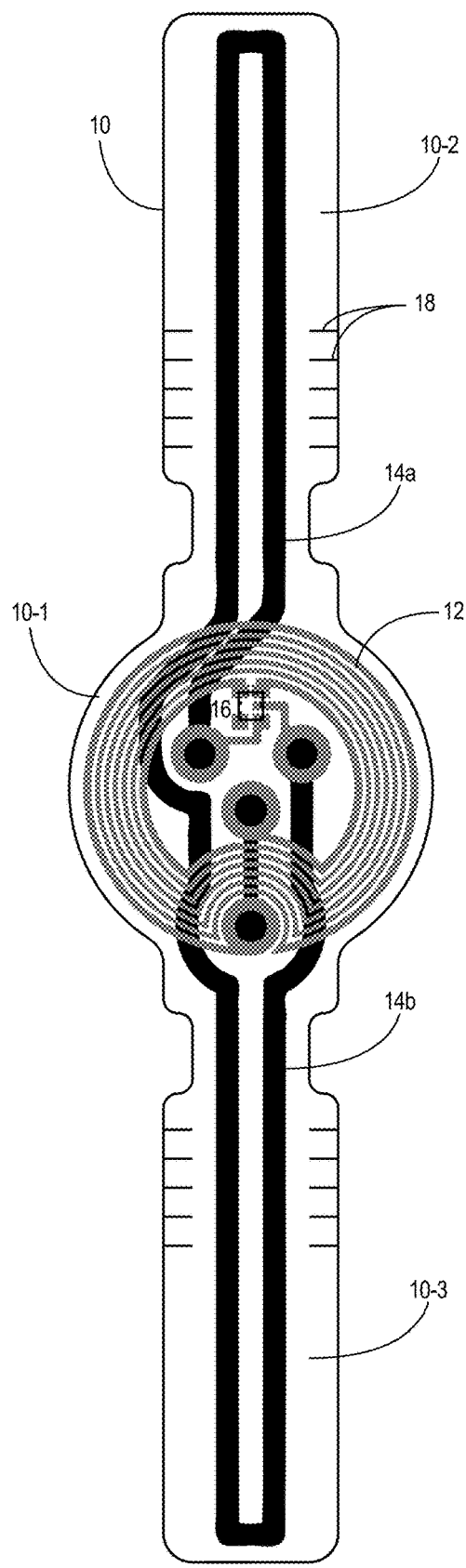
FIG. 1, previously described, illustrates an exemplary conventional anti-counterfeiting tag for bottles.

In a conventional assembly line, tags of the type of FIG. 1 may be attached to bottle necks and then covered by a capsule that is usually provided to protect the cap. The capsule is then designed to be permeable to magnetic waves, at least at its upper part, where the antenna 12 is located. Such capsules are typically crimped with rollers that are rolled around the neck, exerting enough pressure to conform the capsule to the shape of the neck.

In the case of wine bottles, the cap or cork is generally flush with the top of the neck, and the parts in contact with the capsule are smooth shaped. In this case, no failures of the anti-counterfeiting tags are noted.

In some situations, the cap has a hard portion, for example wood, which protrudes from the top of the neck and is flush with the sides of the neck. In this case, there is a gap forming a circumferential groove between the wooden part and the neck. The wooden part may also be knurled and have circumferential grooves, to facilitate the extraction of the cork. Many failures were noted in this situation, where the sacrificial track broke at the circumferential grooves, probably because of excessive pressure exerted by the rollers.

In analyzing the ruptures of the sacrificial track, the inventor found that they were due to cracks that appeared on one edge of the track, and which had time to spread over the entire width of the track, interrupting the conduction, before the end of the crimping operation of the capsule.

Increasing the width of the tracks proved to be inefficient, since the propagation of a crack accelerates in its progression transversely to the tensile stresses.

Figure 2:
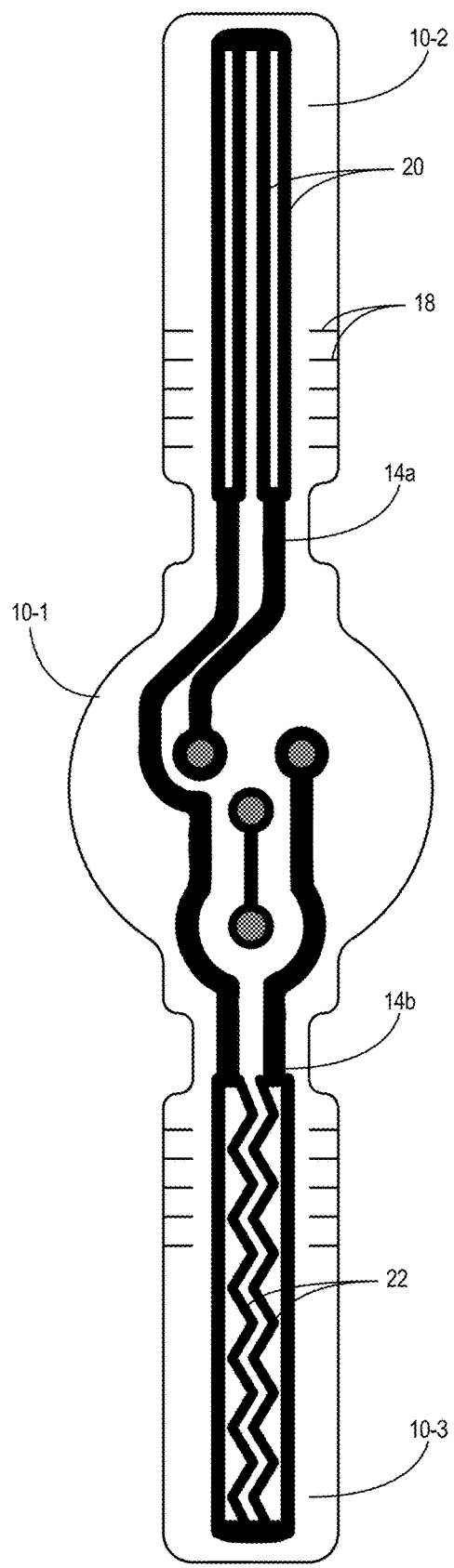
FIG. 2 illustrates an embodiment of an anti-counterfeiting tag, derived from the tag of FIG. 1, made robust to cracking.

FIG. 2 shows an embodiment of anti-counterfeiting tag, derived from the tag of FIG. 1, made robust to cracking. For sake of clarity, the track forming the antenna 12 is not shown.

In fact, FIG. 2 illustrates two different embodiments at the two wings 10-2 and 10-3.

As a general rule, each segment of the sacrificial track 14 that crosses a sacrificial zone, here each of the wings 10-2, 10-3, is split longitudinally into two sub-segments. The sub-segments are thus mechanically independent, that is to say laterally disconnected from one another, but remain electrically connected at the ends of the segment. Mechanical independence ensures that a crack that propagates across one of the sub-segments stops at the edge of the sub-segment and does not reach the adjacent sub-segment. Thus, if one of the sub-segments is cut by a crack, the electrical conduction continues to be ensured by the other sub-segment.

The probability of simultaneous rupture of the two sub-segments is significantly lower than the probability of rupture of a single segment, even if the sum of the widths of the two sub-segments does not exceed the width of the track. Indeed, it would be necessary that a crack be initiated simultaneously in the two sub-segments. In practice, in the studied application example, it turns out that the cracks start from one edge of the track, the edge closest to the edge of the substrate, where the substrate is subjected to more strain to adapt to the curvature of the neck.

The sacrificial track 14 of the tag of FIG. 2 forms a loop in each of the wings 10-2, 10-3. It therefore comprises two segments in each of the wings, and each of these segments is split into two sub-segments.

In the upper wing 10-2, according to a first embodiment, the sub-segments 20 are rectilinear. They may further be spaced apart, as shown, which prevents a crack extending into the substrate from reaching the adjacent sub-segment. As an example, the gap between the sub-segments may have the same width as the sub-segments, this width being half the width of the track 14a. The track may typically have a width of 1.5 millimeters and a thickness of 30 microns.

In the lower wing 10-3, according to a second embodiment, one of the sub-segments may be rectilinear and the other have a sinuous shape, as shown for the inner sub-segments 22. This configuration makes the cracking behavior of the two sub-segments different, and thus reduces the probability of a simultaneous cracking of the two sub-segments.

Of course, the segments may be split into more than two sub-segments, which increases redundancy and ruggedness. In practice, two sub-segments were sufficient in the tests conducted by the inventor to provide a satisfactory failure rate in the intended application. These tests were conducted with tracks having a thickness of 30 microns, rectilinear sub-segments having a width of 0.7 mm, spaced by 0.7 mm.

The invention claimed is:

1. A near-field magnetically coupled anti-counterfeiting tag comprising:
   a sacrificial conductive track that is connected between two distinct pins of a microcircuit and crossing a sacrificial zone of the tag,
   wherein each segment of the sacrificial conductive track crossing the sacrificial zone is split longitudinally into a plurality of sub-segments, the sub-segments being in direct electrical contact with each other at each of the two ends of the sub-segments outside the microcircuit.

2. The tag of claim 1, wherein the sub-segments of a same segment are spaced apart from each other.

3. The tag of claim 1, wherein the sub-segments of a same segment are rectilinear and parallel.

4. The tag of claim 1, wherein one sub-segment of a same segment has a sinuous shape.

5. The tag of claim 4, wherein another sub-segment of the same segment is rectilinear.

6. The tag according to claim 1, comprising
   a central portion including the microcircuit; and
   two sacrificial wings radially extending from the central portion, each wing including a loop of the sacrificial conductive track.

* * * * *